United States Patent
Trujillo et al.

(10) Patent No.: US 12,014,644 B2
(45) Date of Patent: Jun. 18, 2024

(54) SYSTEMS AND METHODS FOR FORMULATION INFORMATION GENERATION

(71) Applicant: AXALTA COATING SYSTEMS IP CO., LLC, Wilmington, DE (US)

(72) Inventors: Oscar Trujillo, Philadelphia, PA (US); Shannon Mayne, Philadelphia, PA (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 934 days.

(21) Appl. No.: 16/457,159

(22) PCT Filed: Dec. 28, 2017

(86) PCT No.: PCT/US2017/068794
§ 371 (c)(1),
(2) Date: Jun. 28, 2019

(87) PCT Pub. No.: WO2018/126057
PCT Pub. Date: Jul. 5, 2018

(65) Prior Publication Data
US 2020/0058229 A1 Feb. 20, 2020

Related U.S. Application Data

(60) Provisional application No. 62/440,454, filed on Dec. 30, 2016.

(51) Int. Cl.
*G09B 11/10* (2006.01)
*G01J 3/46* (2006.01)
*G01J 3/52* (2006.01)
*G09B 5/02* (2006.01)
*G09B 19/00* (2006.01)

(52) U.S. Cl.
CPC .............. *G09B 11/10* (2013.01); *G01J 3/463* (2013.01); *G01J 3/522* (2013.01); *G09B 5/02* (2013.01); *G09B 19/0023* (2013.01)

(58) Field of Classification Search
None
See application file for complete search history.

(56) References Cited

U.S. PATENT DOCUMENTS 5,153,825 A 10/1992 Yauk et al.
6,539,325 B1 3/2003 Numata
(Continued)

FOREIGN PATENT DOCUMENTS

JP 2004269745 A 9/2004
WO 0144767 A1 6/2001
(Continued)

OTHER PUBLICATIONS

Intellectual Property Office, Search Report in Application No. PCT/US1768794, dated Apr. 24, 2018.

*Primary Examiner* — James B Hull
(74) *Attorney, Agent, or Firm* — Lorenz & Kopf, LLP

(57) ABSTRACT

A system and method for automatically producing product mix and application information include a display for depicting a plurality of indicators arranged on a chart. A sensor is used for sensing one of the indicators positioned within the chart. A processor-based system retrieves from a database the mix and application information based upon the sensed indicator. The retrieved mix and application information is provided for mixing paint components.

14 Claims, 11 Drawing Sheets

(56) References Cited

U.S. PATENT DOCUMENTS

| | | |
|---|---|---|
| 6,563,510 B1 | 5/2003 | Rice |
| 2004/0093112 A1 | 5/2004 | Marchand |
| 2009/0295823 A1 | 12/2009 | Henry |
| 2014/0253610 A1 | 9/2014 | Alman et al. |

FOREIGN PATENT DOCUMENTS

| | | |
|---|---|---|
| WO | 2013092679 A1 | 6/2013 |
| WO | 2016191209 A1 | 12/2016 |

| | F1 | F2 | F3 | F4 | F5 | F6 | F7 |
|---|---|---|---|---|---|---|---|
| | VOC Xtra White | VOC Xtra White VOC Xtra Grey | VOC Xtra White VOC Xtra Grey | VOC Xtra Grey | VOC Xtra Grey VOC Xtra Black | VOC Xtra Grey VOC Xtra Black | VOC Xtra Black |
| 100mls | 118.4g | 94.3g 23.6g | 70.4g 46.9g | 115.7g | 92.5g 23.1g | 69.3g 46.2g | 115.2g |
| 200mls | 236.8g | 188.5g 47.1g | 140.8g 93.8g | 231.4g | 184.9g 46.2g | 138.6g 92.4g | 230.3g |
| 300mls | 355.2g | 282.8g 70.7g | 211.1g 140.8g | 347.1g | 277.4g 69.4g | 207.9g 138.6g | 345.5g |
| 400mls | 473.5g | 377.1g 94.3g | 281.5g 187.7g | 462.8g | 369.9g 92.5g | 277.1g 184.8g | 460.6g |
| 500mls | 591.9g | 471.3g 117.9g | 351.9g 234.6g | 578.5g | 462.3g 115.6g | 346.4g 231.0g | 575.8g |
| 600mls | 710.3g | 565.6g 141.4g | 422.3g 281.5g | 694.2g | 554.8g 138.7g | 415.7g 277.1g | 690.9g |
| 700mls | 828.7g | 659.9g 165.0g | 492.6g 328.4g | 809.8g | 647.3g 161.8g | 485.0g 323.3g | 806.1g |
| 800mls | 947.1g | 754.2g 188.5g | 563.0g 375.3g | 925.5g | 739.7g 184.9g | 554.3g 369.5g | 921.2g |
| 900mls | 1065.5g | 848.4g 212.1g | 633.4g 422.3g | 1041.2g | 832.2g 208.1g | 623.6g 415.7g | 1036.4g |
| 1000mls | 1183.9g | 942.7g 235.7g | 703.6g 469.2g | 1156.9g | 924.7g 231.2g | 692.9g 461.9g | 1151.6g |

FIG. 11

SYSTEMS AND METHODS FOR FORMULATION INFORMATION GENERATION

PRIORITY

This application claims the benefit of, priority to and is the national stage application of International Application No. PCT/US2017/068794, filed Dec. 28, 2017 entitled "Systems And Methods For Formulation Information Generation," which claims the benefit of and priority to U.S. Provisional Application No. 62/440,454 filed on Dec. 30, 2016 and entitled "Systems And Methods For Formulation Information Generation," whose disclosures are incorporated by reference herein for all purposes.

TECHNICAL FIELD

The technical field generally relates to chemical formulations, and more particularly relates to processor-implemented systems and methods for formulation information generation.

BACKGROUND

Paint formulation is a complicated process that typically involves lengthy times for training people to understand and utilize all of the different types of formulation components. For example, training new painters to paint and use products is often time consuming before a satisfactory level of product knowledge and product processing competence is reached.

Even after training, a painter can forget much of what the painter has learned in the early stages of product training, and can become frustrated trying to determine the proper product information because of, among other things, all of the different formulations. Before this level of expertise is reached, there is typically a costly excessive material consumption, job failure through operator error, etc. This results in consuming high levels of resources before the painter has achieved an acceptable level of competence.

SUMMARY

In accordance with the teachings provided herein, systems, methods, apparatuses, and non-transitory computer-readable medium for operation upon data processing devices are provided for automatically producing product mix and application information. For example, a system and method include a display for depicting a plurality of indicators arranged on a chart as well as a sensor for sensing one of the indicators positioned within the chart. A processor-based system retrieves from a database the mix and application information based upon the sensed indicator. The retrieved mix and application information are provided for mixing chemical product components.

Still further, the sensed indicator and retrieved mix and application information can provide sufficient information for an inexperienced bodyshop painter, who is unfamiliar with the paint components, to correctly mix the paint components within at least five minutes from the sensing of the indicator, where the bodyshop painter is inexperienced because the bodyshop painter has less than 8 hours of training with respect to the paint components. The sufficient information includes mixing ratios, activator selection, respective component weights depending on size of the job, and suggested volume of ready for use material to mix.

The sensing of the indicator automatically results in both the retrieving from the database of the paint mix and application information and the displaying of the retrieved paint mix and application information upon a computer-human interface.

A processor-based material management system is coupled to the processor-based system through a data communication pathway. The retrieved paint mix and application information is provided to a material management processor-based system to allow a bodyshop to monitor material consumption.

The communication of the retrieved paint mix and application information to the material management processor-based system reduces paint material consumption and waste.

More than five shades can be associated with the indicators displayed on the chart as filler colors. The indicators can be arranged within a tabular pattern within the chart, within a circular pattern within the chart, etc. Therein the chart can include a laminated wall chart or a chart on a touch screen, where the indicators include one or more of the following: symbols, buttons, bar codes, RFID tags, computer interface clicks, and quick response (QR) codes arranged on the chart.

The product mix and application information includes paint mix and application information, where the product mix information includes paint mix types, where the paint mix types include metal mix, plastic mix, or standard mix, where the preparation factors include fast, medium, or slow configurations. The display is used within a chemical mixing environment or paint mixing environment.

The sensor can include a scanner, a bar code reader, a QR code reader, or a sensor that senses a touch on a touch screen for sensing one of the symbols positioned within the chart.

The retrieved mix and application information can include instructions for operating a machine to mix and apply a product. A coating composition can be produced based on the paint mix information.

As another example, a system and method can be configured for producing a coating composition by selecting an input signal from a display. The display depicts a plurality of indicators arranged on a chart, where each indicator is positioned within the chart based upon a unique combination of filler colors and one or more of the following factors: product mix information; coating compositions, surface types, volatile organic compound clear type, mix types, and preparation factors. The input signal is selected by interacting with an indicator from the display. A retrieval from a database is performed for paint mix information and coating application information for the coating composition based upon the input signal using processor-based system. An output is provided of the paint mix information and coating application information. The coating composition is produced based on the paint mix information.

Still further, the output can include a display or printout from the same or a different device than the device that performed the retrieving from the database.

The interacting can include one or more of the following: scanning with a scanner, scanning with a magnetic reader, interacting with a touch screen, interacting with voice commands using a speech recognition device, and interacting with a laser pointer.

The coating composition can be applied over a substrate based on the coating application information. The mixing and applying can be performed at the same site or at different sites. The different sites include separate mixing and applying where a jobber mixes the paint and ships to a body shop to paint. The substrate can be a vehicle, a vehicle part, a damaged vehicle, or a damaged vehicle part.

The sensed indicator and retrieved mix and application information can provide sufficient information for an inexperienced bodyshop painter, who is unfamiliar with the paint components, to correctly mix the paint components within at least five minutes from the sensing of the indicator, where the bodyshop painter is inexperienced because the bodyshop painter has less than 8 hours of training with respect to the paint components. The sufficient information can include mixing ratios, activator selection, respective component weights depending on size of the job, and suggested volume of ready for use material to mix.

The sensing of the indicator can automatically result in both the retrieving from the database of the paint mix and application information and the displaying of the retrieved paint mix and application information upon a computer-human interface.

A processor-based material management system can be coupled to the processor-based system through a data communication pathway, where the retrieved paint mix and application information are provided to a material management processor-based system to allow a bodyshop to monitor material consumption. The communication of the retrieved paint mix and application information to the material management processor-based system reduces paint material consumption and waste.

Additionally, more than five shades can be associated with the indicators displayed on the chart as filler colors.

The indicators can be arranged within a tabular pattern within the chart, within a circular pattern within the chart, etc. The chart can also include a laminated wall chart or a chart on a touch screen, where the indicators include one or more of the following: symbols, buttons, bar codes, RFID tags, computer interface clicks, and quick response (QR) codes arranged on the chart.

The product mix and application information can include paint mix and application information. The product mix information includes paint mix types, where the mix types include metal mix, plastic mix, or standard mix, where the preparation factors include fast, medium, or slow configurations. The display is used within a chemical mixing environment or paint mixing environment.

The sensor can include a scanner, a bar code reader, a QR code reader, or a sensor that senses a touch on a touch screen for sensing one of the symbols positioned within the chart.

The retrieved mix and application information can include instructions for operating a machine to mix and apply a product. The coating composition is produced based on the paint mix information.

As another example, a system and method can be configured for coating a substrate and includes selecting an input signal from a display. The display depicts a plurality of indicators arranged on a chart, where each indicator is positioned within the chart based upon a unique combination of filler colors and one or more of the following factors: product mix information; coating compositions, surface types, volatile organic compound clear type, mix types, and preparation factors. The input signal is selected by interacting with an indicator from the display. Paint mix information and coating application information is retrieved from a database for the coating composition based upon the input signal using processor-based system. An output of the paint mix information and coating application information. The coating composition is produced based on the paint mix information. The coating composition is applied over the substrate based on the coating application information to form a coating layer thereon.

Still further, the coating layer can be formed by applying the coating composition over the substrate by spraying, brushing, dipping, or a combination thereof. The coating layer can be cured at a temperature in a range of from 20° C. to 300° C. to form a cured layer thereon. The substrate can be a vehicle, a vehicle part, a damaged vehicle, or a damaged vehicle part.

DESCRIPTION OF THE DRAWINGS

The exemplary embodiments will hereinafter be described in conjunction with the following drawing figures, wherein like numerals denote like elements, and wherein:

FIG. 11 is a display of various formulation information items in accordance with an embodiment.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

Figure 1:
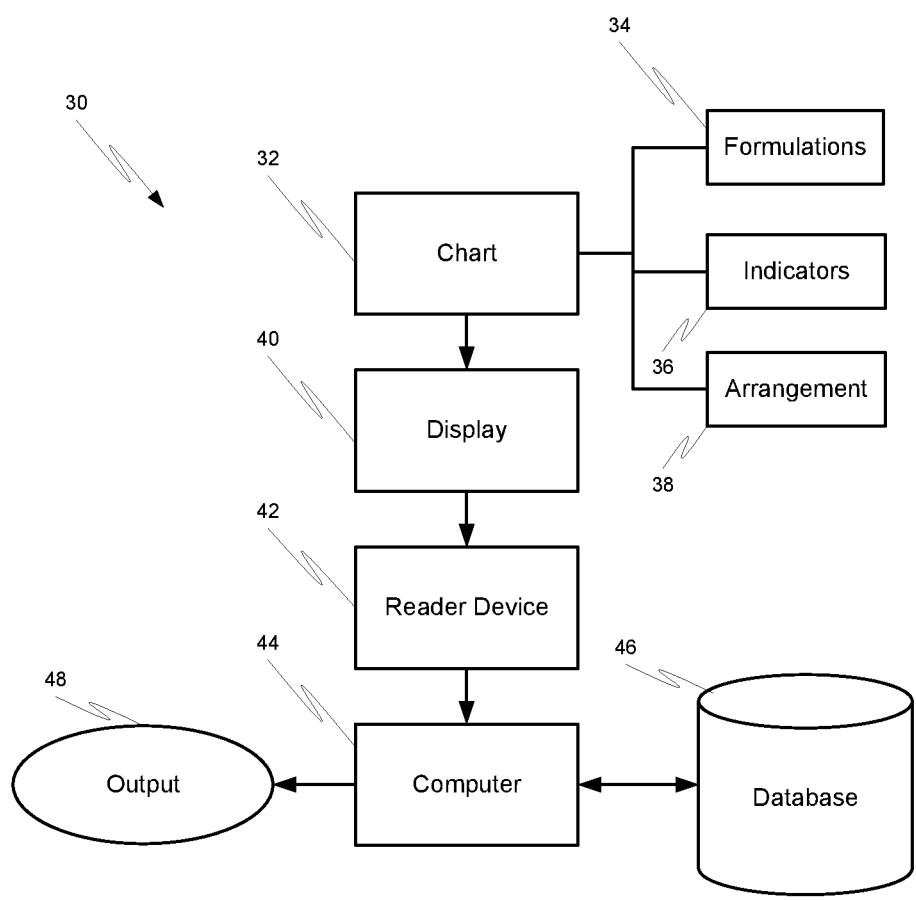
FIG. 1 is a block diagram depicting a system for automatically producing product mix and application information in accordance with an embodiment.

FIG. 1 depicts an example of a system 30 for automatically producing product mix and application information. The system 30 includes a display 40 that contains reading indicators 36 on a chart 32. As an illustration, a display 40 can contain indictors 36 such as bar codes on a wall chart display, clickable interface items on a computer screen display, etc.

Each product associated with a formulation 34 is listed on the chart 32. The indicators 36 have an arrangement 38 within the chart 32 that is organized based upon a unique combination of product factors. These could include filler colors, product mix information, coating compositions, surface types, volatile organic compound (VOC) clear type, mix types, preparation factors, etc.

An end user, such as a painter, can access the mixing and application information pertaining to that product by reading the indicator 36 on the chart 32 with a reader device 42 that is linked to a database 46 through computer 44. This reading takes the painter straight to the mixing and application information stored in the database 46. With the mixing and application information output 48 from the database 46, the end user has the necessary information for mixing and application including, for example, mixing ratios, activator selection, respective component weights depending on the size of the job and the suggested volume of ready for use material to mix.

Such a system helps reduce initial and ongoing training time, especially when new personnel need to be trained or when new formulations are released. To provide optimal coverage and to address different situations, many formulation variations can be provided to the end-user. In this situation, the system provides the correct formula ratios without requiring extensive training. For example, the end-user only needs to scan the correct indicator on the chart to obtain the proper formulation for mixing such items as shades, clear coats, etc.

Figure 2:
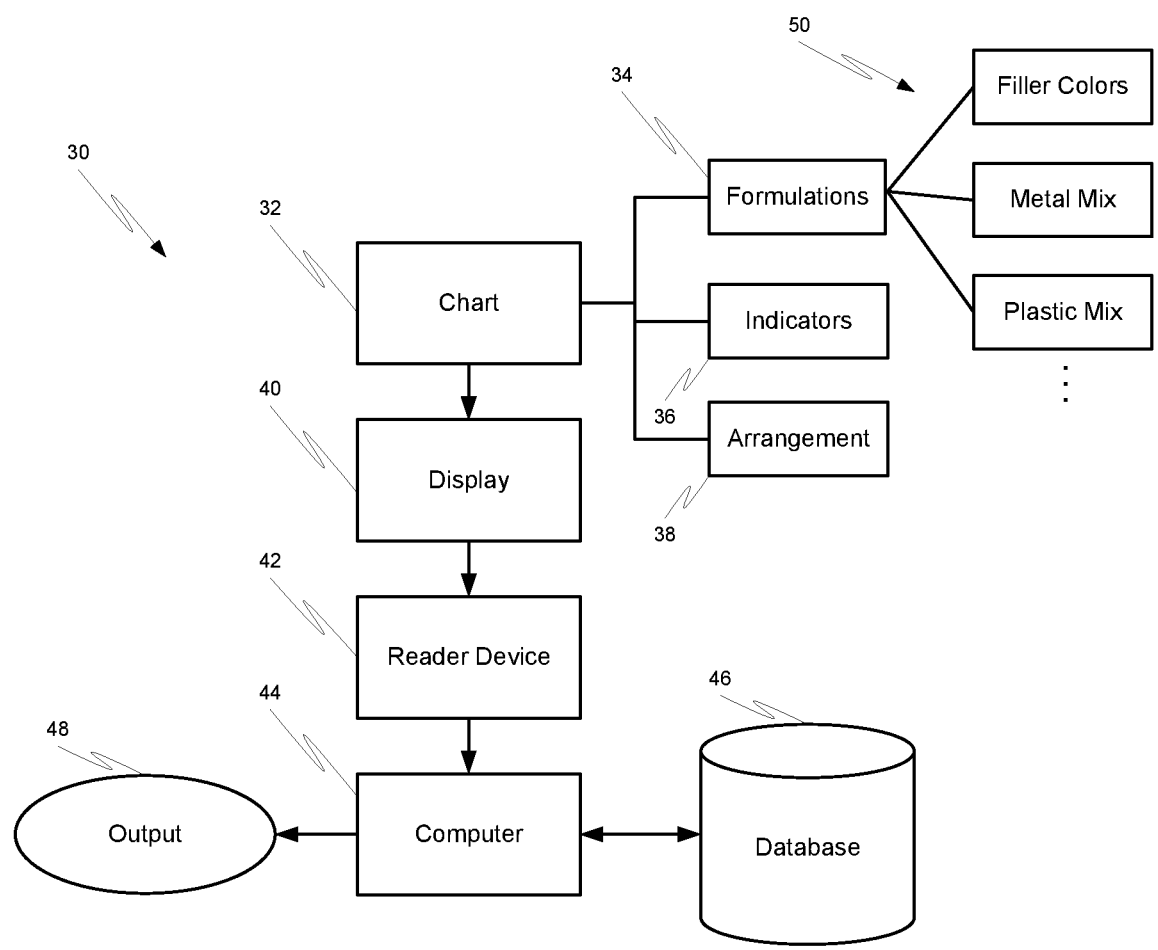
FIGS. 2-5 are block diagrams illustrating that the items associated with the chart contains different types of information in accordance with an embodiment.
Figure 3:
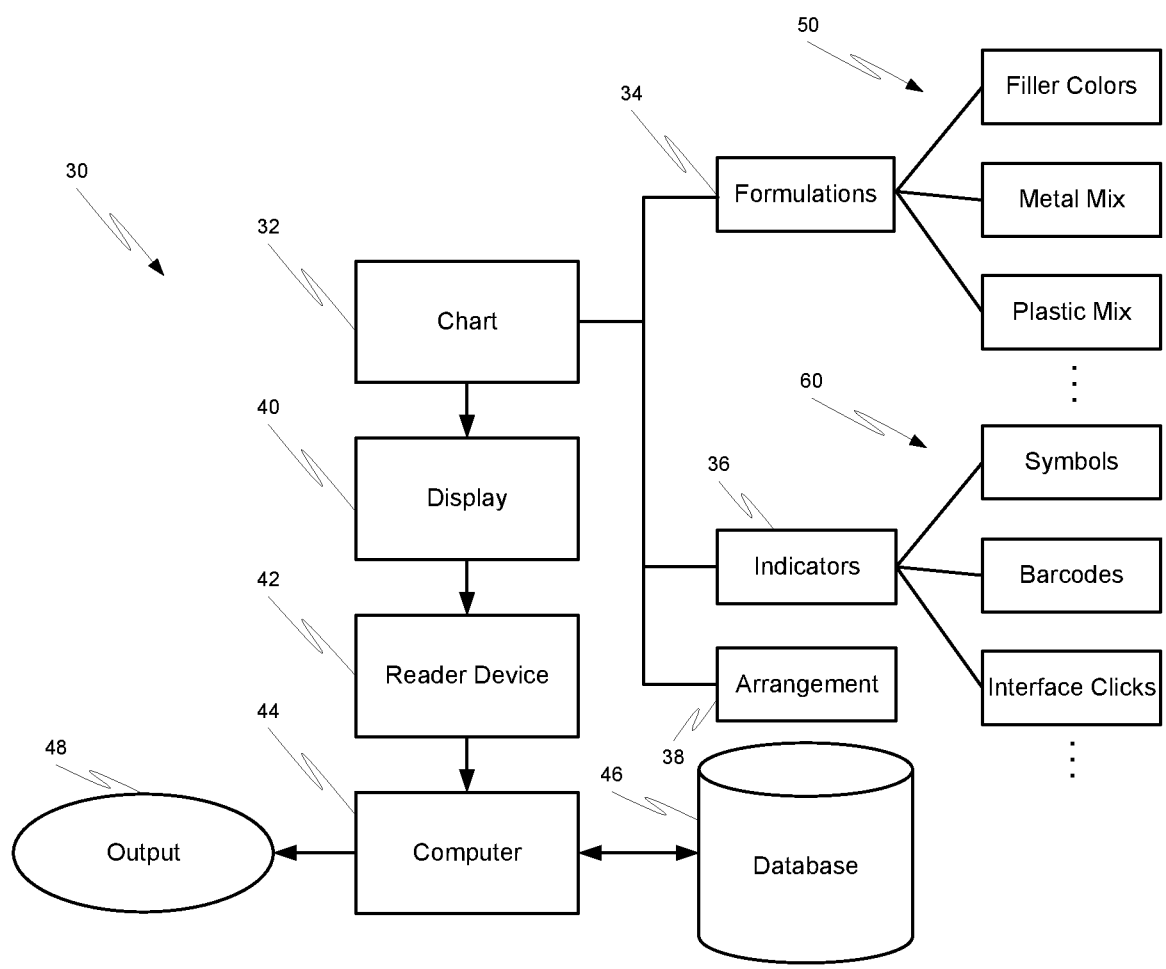
Figure 4:
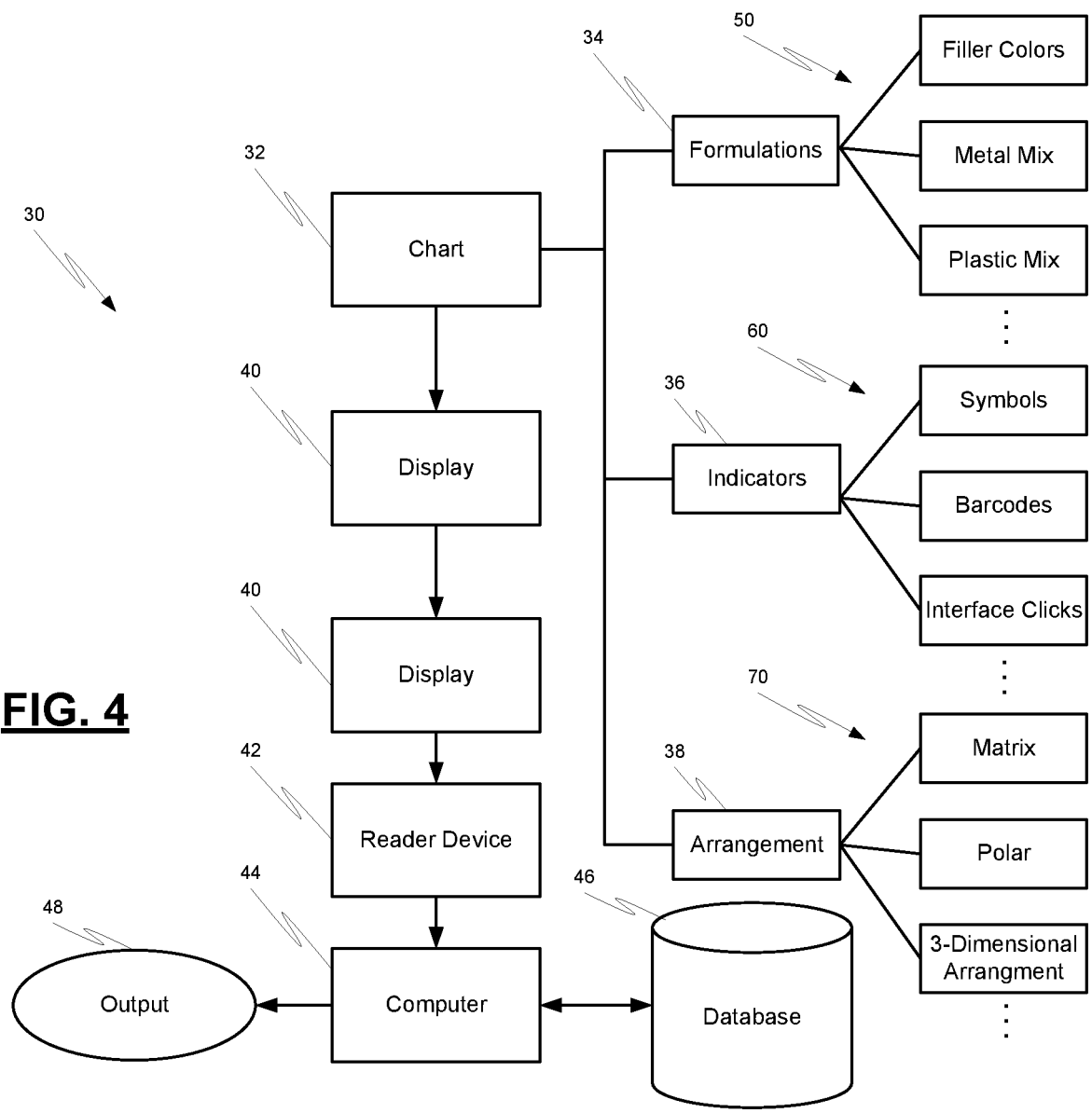

FIGS. 2-4 illustrate that the items associated with the chart 32 can represent many different types of information. For example, the indicators 36 can be associated with different types of formulations and formulation components as shown at 50. These can include filler colors, metal mix components, plastic mix components, etc.

The indicators 36 themselves can assume many different types of visualizations on the chart 32 as shown at 60. These can include symbols, buttons, bar codes, RFID tags, quick response (QR) codes, items on the computer screen display that can be activated by interface clicks, etc.

The indicators 36 can have many different types of arrangements 38 on the chart 32 as shown at 70. An example of an arrangement can include the indicators 36 being positioned on the chart 32 in a tabular format. In this way, the indicators appear as a matrix of options from which end-user can select a desired formulation without having to understand the formulation details. Other arrangements 38 can include, for example, a circular or polar format as well as a three-dimensional depiction. A three-dimensional depiction can be provided with a graphical chart that assumes a three-dimensional representation. Additionally, virtual reality smart glasses can allow an end-user to see the indicators 36 in a three-dimensional arrangement.

Different types of charts can be used for the indicators. Examples include a laminated wall chart, a chart on a touch screen, a device that allows voice activation for formulation selection, etc.

Figure 5:
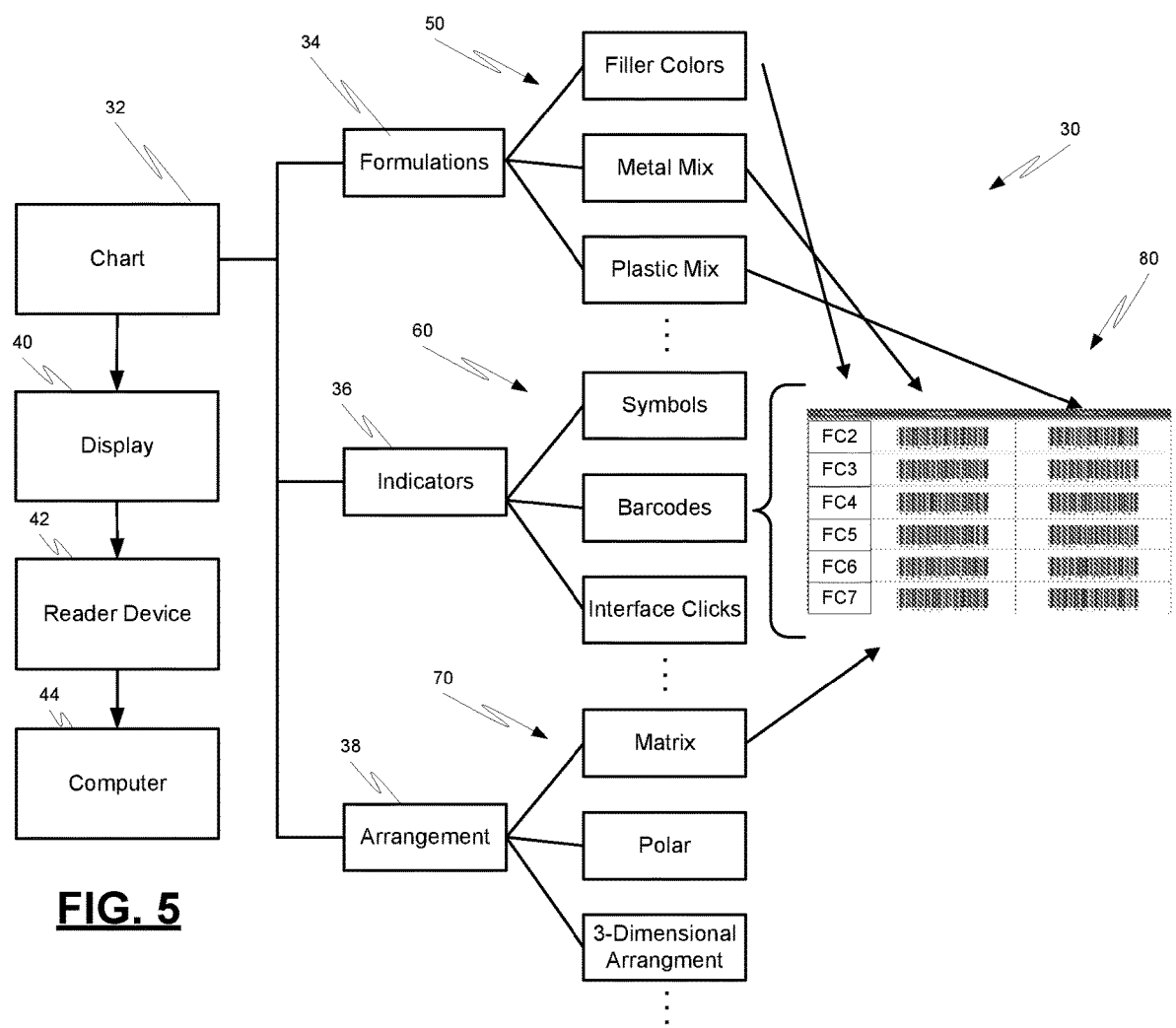
Figure 6:
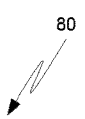
FIGS. 6-8 are display diagrams illustrating various factors being arranged in a matrix format in accordance with different embodiments.

FIG. 5 illustrates an arrangement 38 that shows at 80 various factors being arranged in a matrix format. FIG. 6 shows at 80 a larger version of the chart. In this example, filler colors (FC2-FC7) are interrelated in a matrix format with such other factors as metal mix and plastic mix. A unique barcode appears at the intersection of these factors.

Figure 7:
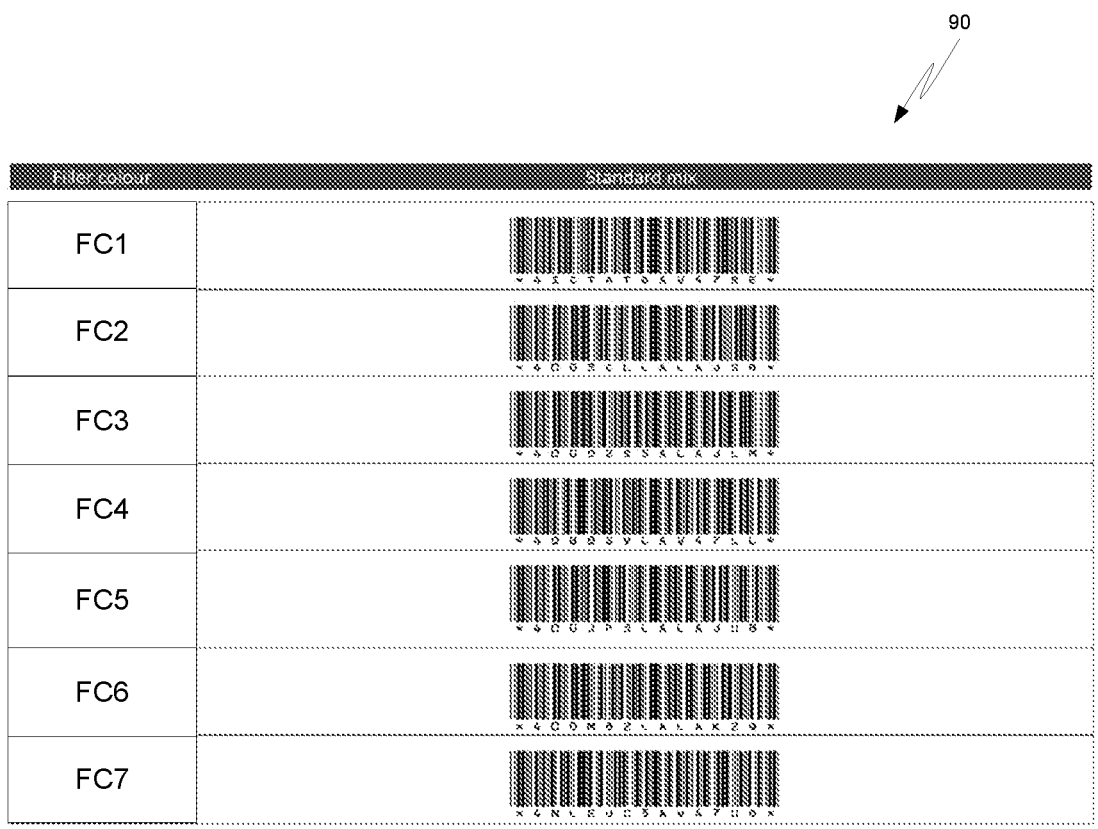
Figure 8:

It should be understood that many different factors and arrangements can be utilized. As an illustration, FIG. 7 depicts an arrangement of filler colors with respect to a standard mix. As another illustration, FIG. 8 depicts arrangement of clear coat-related factors (VOC 2K clear, etc.) being interrelated with such other factors as fast, medium, and slow preparations.

Figure 9:
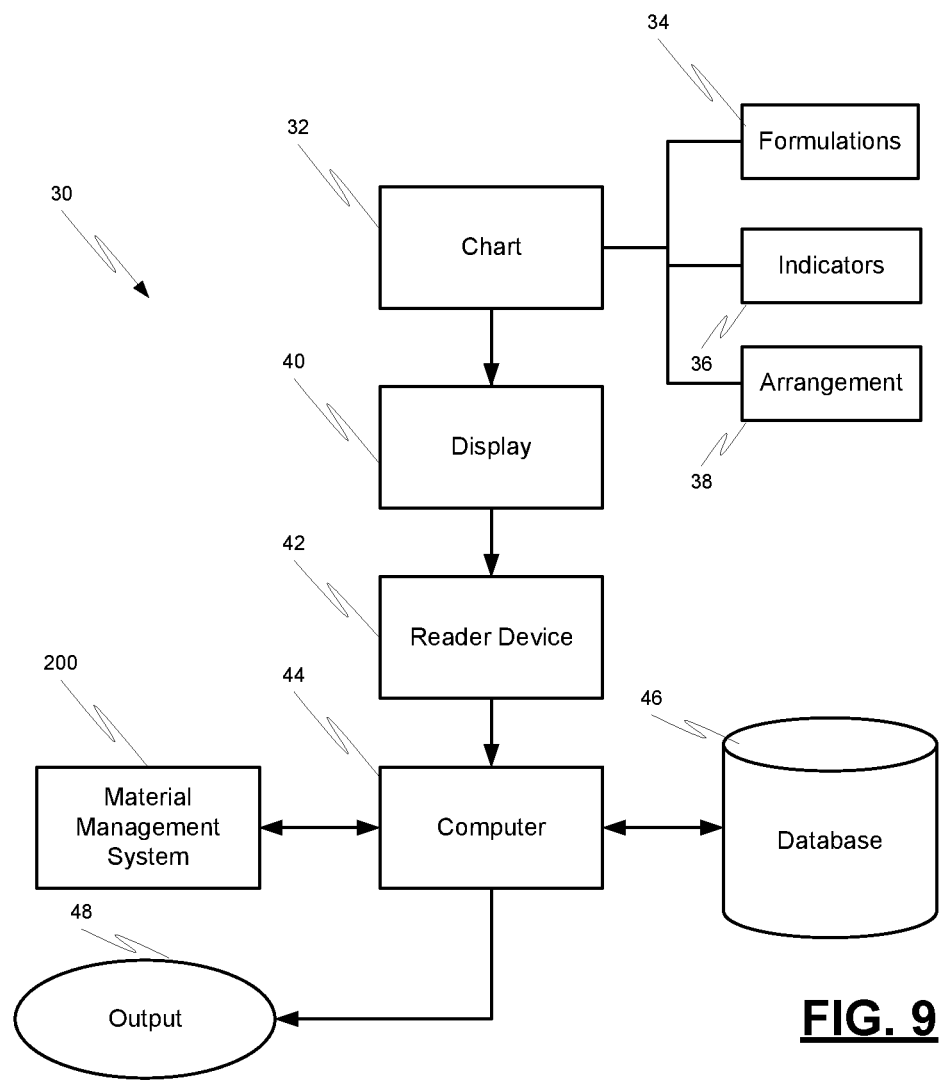
FIG. 9 is a block diagram illustrating different architectural configurations being used with the system in accordance with an embodiment.

FIG. 9 illustrates that many different architectural configurations can be used with the system 30. In this example, the end-user accesses the mixing and application information pertaining to a product by reading the indicator on a chart. This reading automatically retrieves all necessary information including mixing ratios, activator selection, respective component weights depending on the size of the job and the suggested volume of ready for use material to mix. This information can be linked to a material management system 200 to allow the bodyshop to monitor material consumption.

The processor-based material management system 200 communicates to the computer 44 through a data communication pathway. The data communication pathway can be an Internet-based communication system, WI-FI, or other type of networked or direct communication connection approach.

With the material management system 200, the system 30 can identify, for example, how much of a particular component is available for utilization in a formulation. The material management system 200 also can process the retrieved paint mix and application information to allow a bodyshop to monitor material consumption. This communication of the retrieved paint mix and application information to the material management processor-based system reduces paint material consumption and waste.

Figure 10:
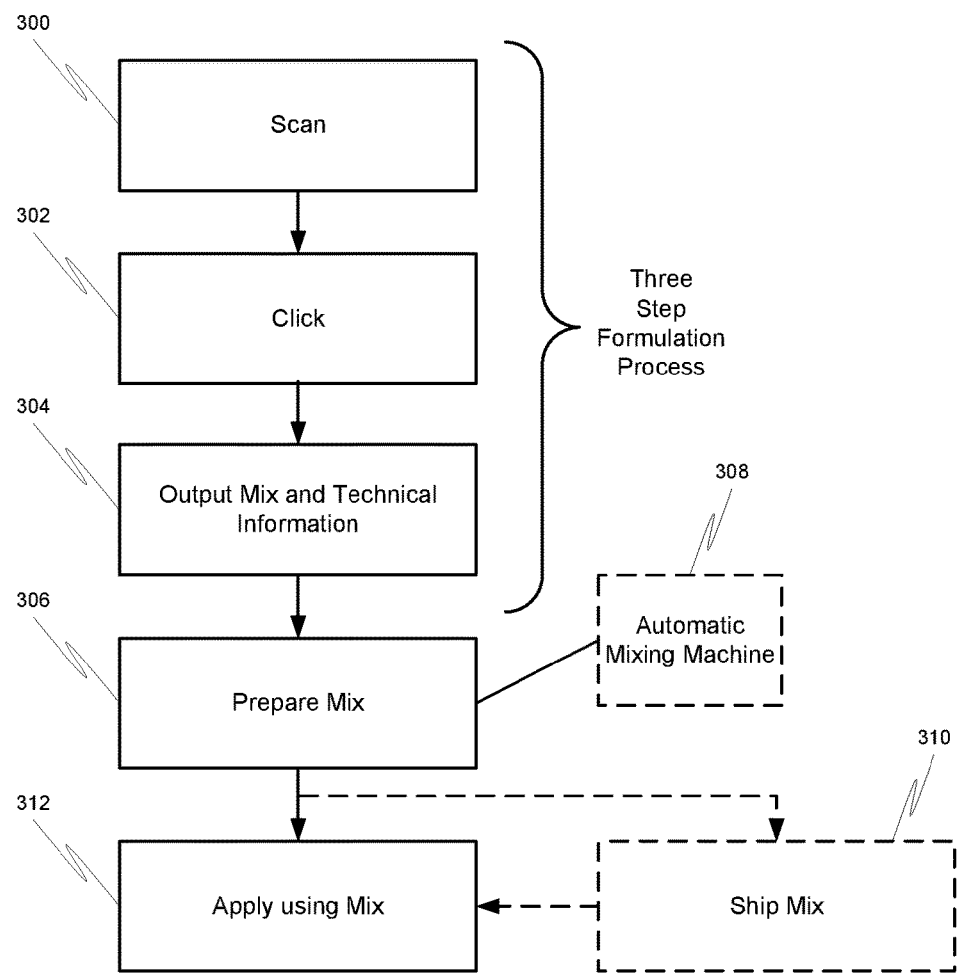
FIG. 10 is a flow chart illustrating an operational scenario in accordance with an embodiment.

FIG. 10 provides an example of an operational scenario for formulation. In this operational scenario, the product information tool includes reading indicators on a chart, such as bar codes. Each formula that is in the database of the color and formulation retrieval software database (e.g., color formulas, ancillary product mixes, etc.) has an assigned barcode.

More specifically in this operational scenario, every official formula that is in the database of the color retrieval software (both color formulas and ancillary product mixes) has an assigned barcode. These barcodes are unique to that color formula or the ancillary product mix. For example, a barcode can be printed for a specific color or ancillary product and scanned to display these formulas to mix.

With the formulation retrieval system, a chart has a combination of color formulas on a color search screen and ancillary product mixes, such as primers and clears on an ancillary product screen for each of the brands. The color retrieval software also has the capability to create individual personal formulas for actual colors and it also has the ability to create 'Quick Selects' for the ancillary products. 'Quick Selects' are 'saved ancillary product mixes' that are accessed through a drop down box in the Ancillary Product screen without using any barcodes.

This operational scenario addresses overcoming not having barcodes for the ancillary products by creating specific ancillary product mixes as 'personal formulas', finding the unique barcode and printing out that barcode. The end-user can look for a specific ancillary product mix, scan the barcode and mix the correct products.

The barcodes are unique to that color formula or the ancillary product mix. For example, when a barcode is printed for a specific color or ancillary product, the appropriate barcode can be scanned at 300 to display these formulas to mix upon clicking the appropriate item on a computer human display interface at 302.

At 304, the mix and other formulation information is outputted. This can include an output to a computer display as well as direct output to an automatic mixing machine 308. With the automatic mixing machine 306, the end-user need not be involved with even viewing the formulation information. But rather in this operational scenario, the end-user scans the appropriate barcode in the automatic mixing machine appears to formulation based upon the outputted information at 304. In other operational scenarios, the information can be displayed on a computer screen, printed out, or stored as a file (e.g., a PDF, Microsoft Excel or Microsoft Word file). The system can also extract the information and transform it into an actionable and structured "instruction", such as formatted tables, paragraphs, etc., by including only the relevant formulation and application information and removing/excluding irrelevant information.

The mix could be applied at 312 directly at the location of the end-user (e.g. a bodyshop, etc.) or could be shipped to remote location 310 so that it could be applied at that remote location. If different sites are involved, then separate mixing and applying can occur where a jobber mixes the paint and ships it to a body shop to paint.

FIG. 11 provides at 400 an example of different types of information that can be obtained and utilized for formulation purposes. This is the type of information that the end-user is not required to have direct knowledge because such information is automatically retrieved. This can include mixing ratios, activator selection, respective component weights depending on the size of the job and the suggested volume of ready for use material to mix.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those of ordinary skill in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

As an example of the wide variations of the systems and methods disclosed herein, the disclosed systems and methods provide sufficient information for an inexperienced bodyshop painter, who is unfamiliar with the paint components, to correctly mix the paint components within a short amount of time (e.g., at least five minutes from the sensing of the indicator. Sufficient information can include mixing ratios, activator selection, respective component weights depending on size of the job, and suggested volume of ready for use material to mix. In this example, the bodyshop painter is inexperienced because the bodyshop painter has less than a certain amount of training (e.g., 8 hours) with respect to paint technology.

The systems and methods can be used in paint shops as well as other types of chemical mixing environments. For the paint shops, the coating compositions are produced based on the sensed paint mix information. The coating composition can be applied over a substrate based on the coating application information. The substrate could include a vehicle, a vehicle part, a damaged vehicle, or a damaged vehicle part.

Additionally, the coating composition can be applied over the substrate based on the coating application information to form a coating layer thereon. The coating layer is formed by applying the coating composition over the substrate by spraying, brushing, dipping, or a combination thereof. The process can cure the coating layer at a temperature in a range of from 20° C. to 300° C. to form a cured layer thereon.

To sense the desired formulation, different types of sensors can be used, including a scanner, magnetic reader, bar code reader, QR code reader, a sensor that senses a touch on a touch screen for sensing one of the symbols positioned within the chart, laser pointing, etc. Interaction can also include interacting with voice commands to select a formulation using a speech recognition device. The output can include a display or printout from the same or a different device than the device that retrieves the information from the database.

As another example of the wide variations of the systems and methods disclosed herein, systems and methods can be configured as follows. The systems' and methods' data (e.g., associations, mappings, data input, data output, intermediate data results, final data results, etc.) may be stored and implemented in one or more different types of computer-implemented data stores, such as different types of storage devices and programming constructs (e.g., memory, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

Still further, the systems and methods may be provided on many different types of computer-readable storage media including computer storage mechanisms (e.g., non-transitory media, such as CD-ROM, diskette, RAM, flash memory, computer's hard drive, etc.) that contain instructions (e.g., software) for use in execution by a processor to perform the methods' operations and implement the systems described herein.

What is claimed is:

1. A system for automatically producing product mix and application information within a paint shop, said system comprising:
   a paint formula display within the paint shop depicting a plurality of machine-readable indicators arranged on a chart; wherein each machine-readable indicator is positioned within the chart based upon a unique combination of filler colors and one or more of the following factors: product mix information; coating compositions, surface types, volatile organic compound clear type, mix types, and preparation factors;
   a sensor configured for sensing one of the machine-readable indicators positioned within the chart, wherein the machine-readable indicators are non-human readable indicators that are converted by the sensor into processor-readable data; and
   a processor-based system that accesses a color and formulation retrieval software database, wherein the color and formulation retrieval software database contains a unique association between the machine-readable indicators and each paint formula, wherein the processor-based system retrieves the mix and application information from the color and formulation retrieval software database based upon the sensed machine-readable indicator and the association between the machine-readable indicators and each paint formula;
   wherein an automatic mixing machine directly receives the retrieved mix and application information and mixes paint components based upon the retrieved mix and application information.

2. The system of claim 1, wherein the mix and application information includes paint mix types.

3. The system of claim 2, wherein the mix and application information includes mixing ratios, activator selection, respective component weights depending on size of the job, and suggested volume of ready for use material to mix.

4. The system of claim 1, wherein said sensing of the machine-readable indicator automatically results in both said retrieving from the color and formulation retrieval software database of the paint mix and application information and said displaying of the retrieved paint mix and application information upon a computer-human interface.

5. The system of claim 1, further comprising a processor-based material management system coupled to said processor-based system through a data communication pathway;
   wherein the retrieved paint mix and application information is provided to a material management processor-based system which includes material mixing ratios, thereby allowing a bodyshop to monitor material consumption.

6. The system of claim 5, wherein the processor-based system is further configured to communicate, without human intervention, the retrieved paint mix and application information to the automatic mixing machine in order to reduce paint material consumption and waste.

7. The system of claim 1, wherein more than five shades are associated with the machine-readable indicators displayed on the chart as filler colors.

8. The system of claim 1, wherein the machine-readable indicators are arranged within a tabular pattern within the chart.

9. The system of claim 1, wherein the machine-readable indicators are arranged within a circular pattern within the chart.

10. The system of claim 1, wherein the chart includes a laminated wall chart or a chart on a touch screen; wherein the machine-readable indicators include one or more of the following: symbols, buttons, bar codes, RFID tags, computer interface clicks, and quick response (QR) codes arranged on the chart.

11. The system of claim 1, wherein the product mix and application information includes paint mix and application information; wherein the product mix information includes paint mix types; wherein the mix types include metal mix, plastic mix, or standard mix; wherein the preparation factors include fast, medium, or slow configurations; wherein the paint formula display is used within a chemical mixing environment or paint mixing environment.

12. The system of claim 1, wherein the sensor includes a scanner, a bar code reader, a QR code reader, or a sensor that senses a touch on a touch screen for sensing one of the symbols positioned within the chart.

13. The system of claim 1, wherein the retrieved mix and application information includes instructions for applying a product.

14. The system of claim 1, wherein a coating composition is produced based on the retrieved paint mix and application information.

* * * * *